United States Patent
Ennen, Jr.

(10) Patent No.: US 6,832,953 B1
(45) Date of Patent: Dec. 21, 2004

(54) SPACERS AND FLAP CONTROL FOR HARVESTER SHOE HOUSING

(76) Inventor: Gordon Ennen, Jr., P.O. Box 22, Ross, ND (US) 58776

( * ) Notice: Subject to any disclaimer, the term of this patent is extended or adjusted under 35 U.S.C. 154(b) by 0 days.

(21) Appl. No.: 10/608,494

(22) Filed: Jun. 30, 2003

(51) Int. Cl.⁷ .............................................. A01F 12/60
(52) U.S. Cl. ......................... 460/119; 403/390; 403/23
(58) Field of Search .................... 460/119; 403/390, 403/23

(56) References Cited

U.S. PATENT DOCUMENTS

| | | |
|---|---|---|
| 3,628,316 A | 12/1971 | Rea, Sr. |
| 3,808,783 A | 5/1974 | Sutherland et al. |
| 4,219,992 A | 9/1980 | Henry, Sr. |
| 4,415,825 A * | 11/1983 | Dailey et al. ................ 310/270 |
| 4,429,516 A | 2/1984 | Erickson |
| 4,538,404 A | 9/1985 | Heimark, Jr. et al. |
| 4,700,537 A | 10/1987 | Emmert |
| 5,077,964 A | 1/1992 | Kabat |
| 5,405,292 A * | 4/1995 | McConnell ................ 460/119 |
| 5,787,697 A | 8/1998 | Post |

* cited by examiner

*Primary Examiner*—Árpád Fábián Kovács
(74) *Attorney, Agent, or Firm*—Bacon & Thomas, PLLC

(57) ABSTRACT

For establishing proper clearance between adjacent parts of a combine harvesting machine spacers are provided which create a clearance between housing parts of the combine. The clearance produces a gap which is to be controlled in terms of its extent. To control the extent of the gap, a flap member of flexible material is used. The flap member provides for control of airflow through the machine after proper clearances are established.

5 Claims, 3 Drawing Sheets

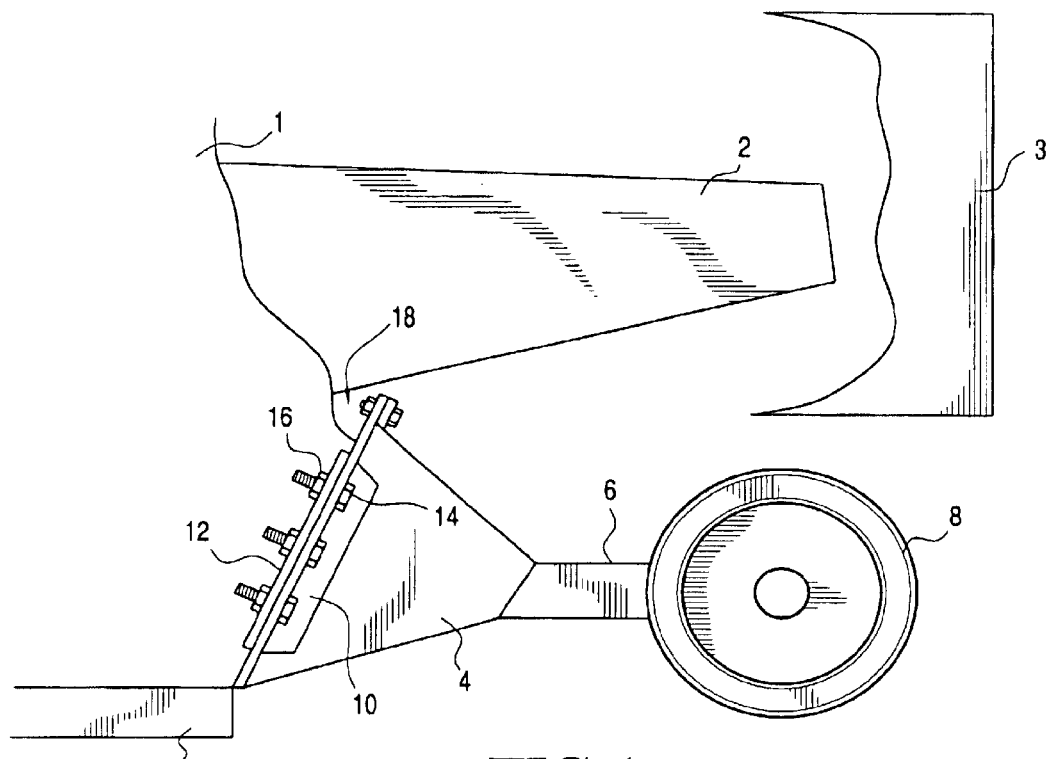
FIG.1
(Prior Art)
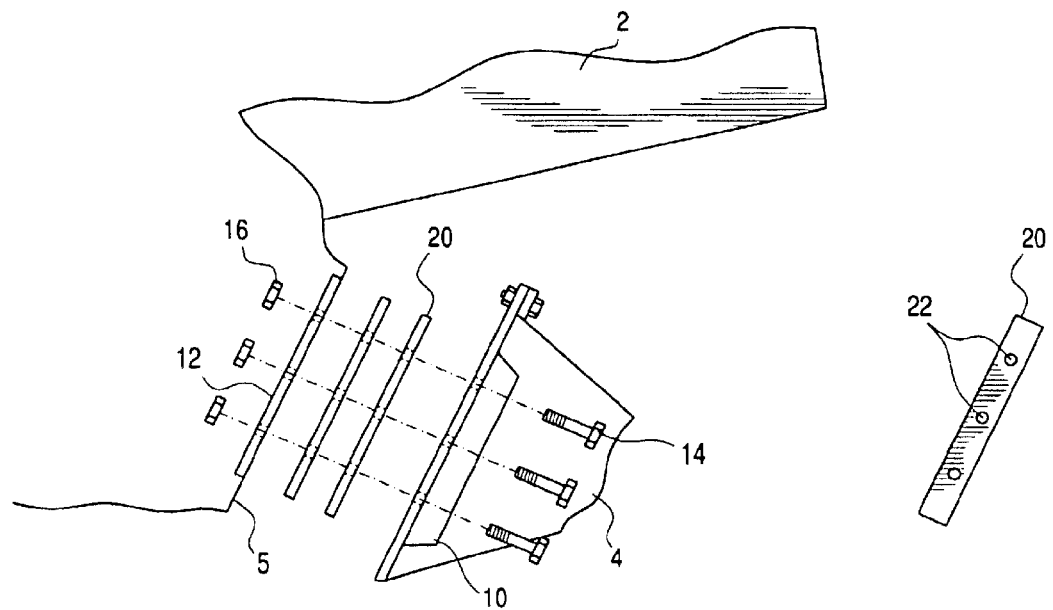 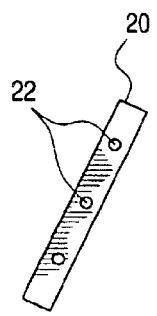
FIG.2a        FIG.2b

SPACERS AND FLAP CONTROL FOR HARVESTER SHOE HOUSING

BACKGROUND OF THE INVENTION

This invention relates in general to machine assemblies comprised of multiple interacting parts to form a useable and durable machine assembly and in particular to crop harvesting machines known as combines.

Modem combines are complex and costly machines which are capable of harvesting a wide variety of crops. By attaching different heads at the front of the combine, it can harvest corn, grains, beans and many other similar crops. During harvest season the combines are heavily used, often operating day and night. This continuous operation over rough fields causes wear on parts thus reducing the required clearance between parts which was built into the design of the machine. In addition, when the combine is fully loaded with the crop, the weight of the crop can cause distortion of some structural parts and again will reduce the clearance between adjacent parts. If the clearance is reduced to zero, the adjacent parts come into contact with each other and such contact can cause severe damage to the machine and delay harvesting of crops beyond their optimum ripeness. Damage is especially bad when the contact is between a moving part and a stationary part. For example, the shoe of most combines oscillates in a fore and aft direction in order to shake the material on the sieves mounted in the shoe and separate the crop from the chaff. In this condition, the hammering of interfering parts due to this oscillation not only damages the interfering parts but also damages internal parts of the machine which are fastened to the moving chaff.

Thus it can be seen that maintaining clearance between operating parts is essential to the profitable operation of a modem combine. It is necessary to have at hand a system for maintaining this clearance as the machine ages or when factory built-in clearances are inadequate initially or change due to wear and tear common in machines used in this environment. In addition, when the clearances between parts is inadequate or adversely changed during operation of the machine, the air flow through the machine is affected. Modem combines require a specified flow of air through the machine in order to properly separate the crop from the vines or stalks to which they are attached when they are harvested. If the gaps between adjacent parts becomes too wide, large amounts of air are lost through the gap and chaff and even crop particles are exhausted through the gaps. This can cause a buildup of chaff on working parts of the combine as well as the loss of crops because tailings which are exhausted through the gap cannot be recycled through the sieve system resulting in further crop loss. Thus it becomes evident that proper clearance between adjacent parts of a combine must be maintained while at the same time the air flow through the machine be kept at recommended volumes.

SUMMARY OF THE INVENTION

In accordance with the invention claimed in this application, an apparatus is disclosed which allows the operator to reestablish proper clearances between parts of the machine which will eliminate the damage caused by parts which have moved from their nominal relative positions to one of interference with each other. In addition, there is also disclosed apparatus for addressing the air loss through the machine after the clearances are widened to prevent damaging interference. The invention may be installed using only ordinary tools and may be done at any cite having a hard surface for jacking the machine up thus eliminating the lost time and expense of transporting the combine to a repair facility. Proper clearances are established between adjacent parts by inserting spacers between the mounting surfaces of the adjacent parts. The number of spacers installed will depend on the movement required to attain proper clearance. The spacers are of simple design and made from readily available stock and are installed using the existing attachment brackets and holes.

To insure proper airflow through the machine a flexible flap is installed and is positioned in the gap widened by the insertion of the spacers between interfering parts. Again, the flap is made of readily available material. The installation kit is fabricated from common stock and can be installed using common mechanic's tools.

It is an object of this invention to provide a means for adjusting the clearance between adjacent machine parts.

A further object is to allow installation of the adjusting means using common mechanic's tools.

A further object is to provide an adjustment means using readily available stock.

A further object of this invention is to provide a means for controlling airflow between adjacent parts after clearance adjustment.

BRIEF DESCRIPTION OF THE DRAWINGS

FIG. 1 is a partial elevation of a machine according to the prior art.

FIG. 2a is an exploded view of the installation of the spacers of the invention.

FIG. 2b is a detail of the spacer of the invention.

DETAILED DESCRIPTION ON THE INVENTION

Figure 3:
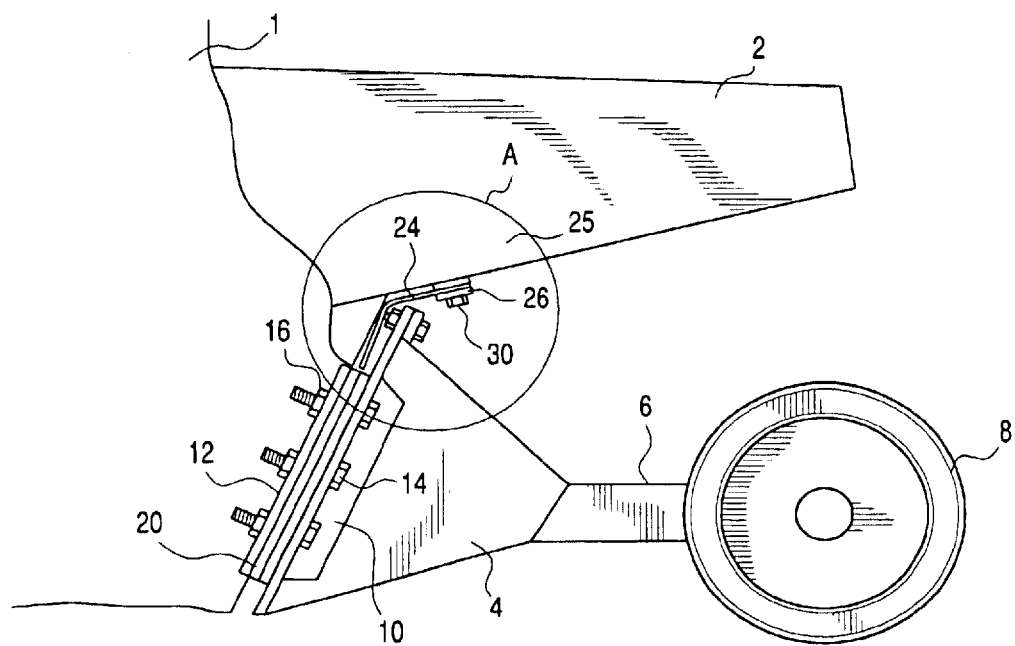
FIG. 3 is a partial elevation of the combine with parts of the invention installed.

Referring now to FIG. 1, there is shown a partial elevation view of the portion of the rear of the combine assembled according to the prior art. Only one side of the machine is illustrated, however it is intended that this description apply to both sides in the same manner. The housing 2 contains the shoe of the combine and is at the rear portion of the machine. The outer cover 3 has been cut away for clarity. The rear axle housing 4 is assembled to the rear of the housing 1 and is attached to the frame 5 at mounting bracket 12 on the frame 5 and bracket 10 on the axle housing. These brackets are typically made of angle iron and have matching holes. The two brackets are secured together by a series of bolts 14 and nuts 16. The axle housing terminates in a box structure 6 which carries the rear axle (not shown.) and the rear wheels 8 attached to the rear axle. Typically, the rear axle is the steering axle of the combine to improve maneuverability, The space 18 between the shoe housing and the axle housing is small or, in some cases nonexistent and with wear on certain parts or attaching means as well as distortion of the housings under a full crop load, this space can be substantially reduced and may even become zero resulting in interference between the oscillating shoe housing 2 and the axle housing 4. When interference occurs, the destructive impact forces can damage internal working parts of the combines crop cleaning system.

Referring now to FIG. 2a there is shown the spacers of the invention in an exploded view to illustrate the installation. The axle housing 4 is removed from the attachment bracket 12 of the frame 5. A plurality of spacer bars, 20 are inserted between the frame bracket 12 and the axle housing bracket 10. The number of spacers required will depend on the desired space specified between the housings shown at 18 in FIG. 1. Typically, three spacers of ¼ inch thickness are used The original bolts 14 are replaced with longer bolts of the same diameter to accommodate the additional thickness of the spacers FIG. 2b shows a detail drawing of the spacer 20. Typically it is made of ¼ inch steel plate and drilled or punched with holes 22 in a pattern matching the hole pattern of the brackets 10 and 12. In a typical installation the spacer will be about one and one half inches wide and 21 inches long.

In FIG. 3 there is shown the completed assembly of the spacers in place between the brackets 10 and 12. It is to be understood that the installation shown in FIG. 3 is repeated on the other side of the combine in the same manner. In this FIG. 3 there is also shown the second part of the invention the flap member 24 and its attaching piece 26. The assembly of this flap within circle A of FIG. 3 is shown in an enlarged detail in FIG. 4.

Figure 4A:
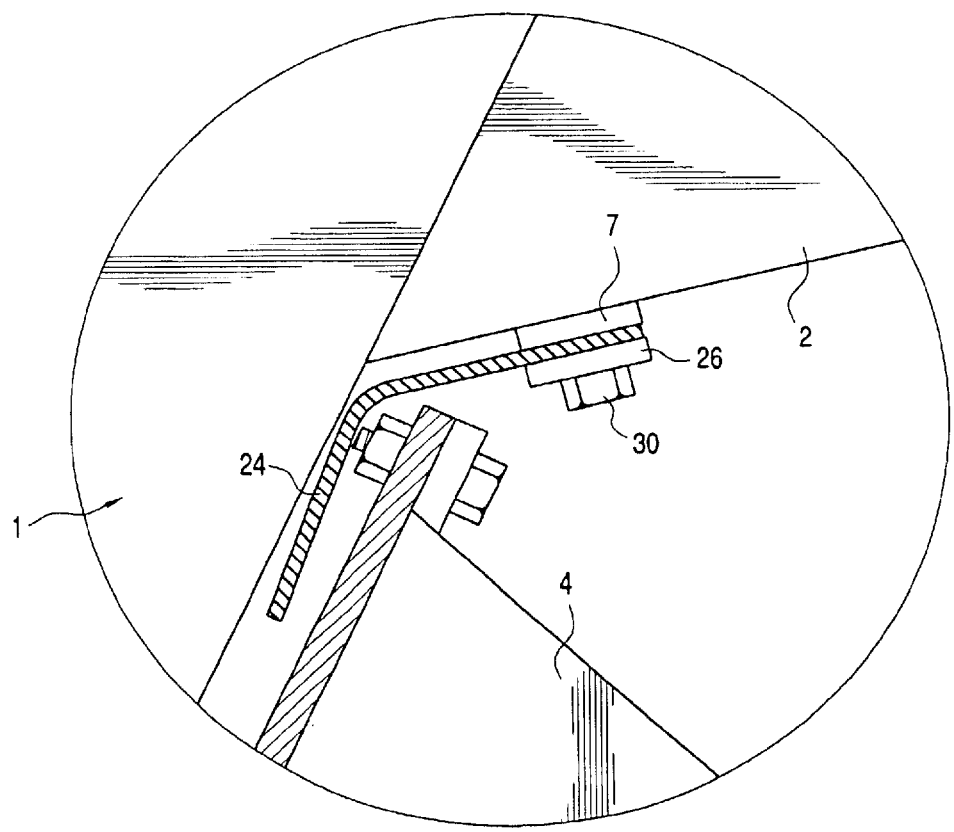
FIG. 4a is an enlarged view of the circled portion of FIG. 3 showing another part of the invention installed.
Figure 4B:
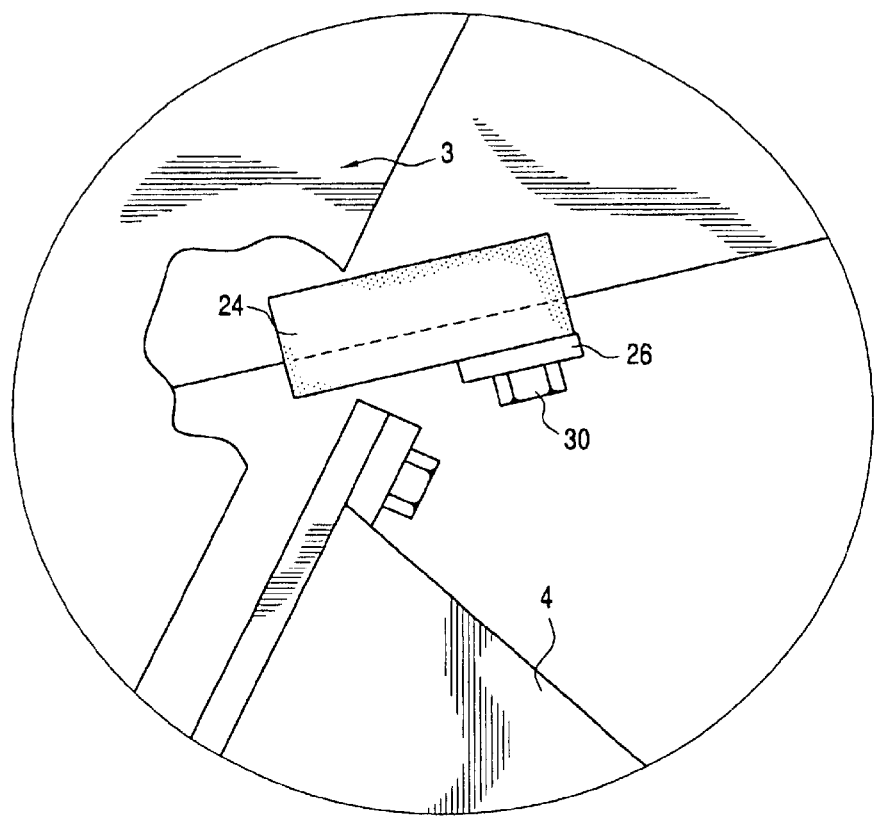
FIG. 4b is an elevation view of the combine with a portion of the outer cover removed to show the wrap around feature of the flap.
Figure 5A:
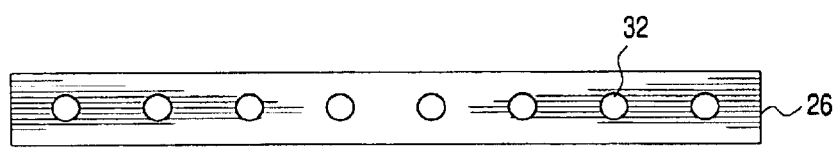
FIGS. 5a and 5b are details of the installation shown in FIG. 4.
Figure 5B:
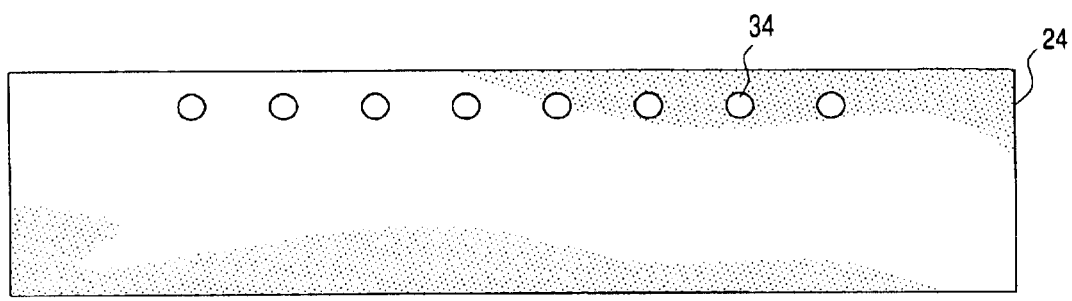

In FIG. 4a, there is shown the flexible flap 24 which extends into the gap 18 to control air loss between the shoe housing 2 and the axle housing 4. This flap is typically rubber or similar flexible material approximately ⅛ inch thick which can withstand the rough environment in this location during combine operation. FIG. 4b illustrates the flap end extended past the width of the shoe housing and wrapped around the side of the shoe housing to further control the air loss from the shoe. This flap 24 is shown in detail in FIG. 5b. The flap is attached to the underside of the shoe housing 2 by means of the attaching piece 26 shown in detail in FIG. 5a. As shown in FIGS. 5a and 5b, the attaching piece 26 is provided with a series of holes 32 which match the holes 34 provided in the flap. As shown in FIG. 4a, the flap flap 24 is placed against a stiffener piece 7 on the lower surface of the shoe housing 2 and runs substantially along the width of the housing 2 and extend around the side of the shoe housing a short distance. The flap 24 is attached to the shoe housing 2 by means of attaching piece 26 and self tapping screws 30 inserted in the holes 32 of the attaching piece 26 and the holes of the flap 34. The attaching piece 26 is typically made of ⅛ inch steel and would be approximately 1 inch wide and 60 inches long. The flap 24 will be about 9 inches wide and also 66 inches long to provide a 3 inch wrap around at each end.

Thus it can be seen that with the installation of a certain number of spacers between the mounting brackets of the frame and the axle housing, a proper clearance can be established between them which will prevent damage from impact with each other. Also, the installation of the flap member which extends into the space created by the insertion of the spacers controls the air loss between the two housings and improves the efficiency of the combine.

What is claimed is:

1. An improvement for a harvesting machine assembly having forward and rear sides and left and right sides said improvement comprising:

a frame assembly;

a first housing member attached to said frame at said left and right sides;

first and second attachment brackets attached to said frame at the left and right sides of the machine assembly respectively;

a second housing assembled to said machine at the rear of said first housing;

third and fourth attachment brackets attached to the left and right side of said second housing respectively;

spacer means inserted between said first and second attachment brackets and said third and fourth attachment brackets;

fastener means for fastening said first and second brackets and said third and fourth attachment brackets and their respective spacers together whereby a gap of specified dimension is created between said first and second housings;

a shoe housing attached to said first housing for oscillating motion from the forward side to the rear side, said shoe housing mounted above and forward of said second housing, said mounting position providing a clearance gap between said shoe housing and said second housing sufficient to prevent interference between said shoe housing and said second housing during said oscillating motion of said shoe housing a flap member of flexible material of a greater length than the width of said shoe housing attached to said shoe housing and inserted in the clearance gap between said shoe housing and said second housing, said flap extending substantially alone the width of said shoe housing between its left and right sides and wrapping around a portion of the sides of said shoe housing; and attachment means for attaching said flap to said first housing.

2. The invention according to claim 1 wherein said spacers are approximately ¼ inch thick and said fastener means consists of a plurality of bolts extending through said spacers and said first and second brackets and secured by nuts.

3. The invention according to claim 2 wherein said second housing comprises a rear axle housing for said machine.

4. The invention according to claim 1 wherein said flap member is comprised of a rubber sheet and said attachment means comprises a metal strip of the same length as the width of said shoe housing, said strip having a series of holes spaced along its length and a plurality of fastening means inserted in said holes and through said flexible flap member and inserted into the lower surface of said shoe housing.

5. The invention according to claim 4 wherein said fastening means are self tapping metal screws.

\* \* \* \* \*